United States Patent
Kim et al.

(10) Patent No.: US 10,007,047 B2
(45) Date of Patent: Jun. 26, 2018

(54) DISPLAY APPARATUS HAVING THERMALLY PROTECTED BACKLIGHT ASSEMBLY

(71) Applicant: SAMSUNG DISPLAY CO., LTD., Yongin, Gyeonggi-Do (KR)

(72) Inventors: Hyoung-Joo Kim, Anyang-si (KR); JinHee Park, Cheonan-si (KR); Young-Min Park, Seoul (KR); JooYoung Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days. days.

(21) Appl. No.: 14/958,626

(22) Filed: Dec. 3, 2015

(65) Prior Publication Data

US 2016/0085015 A1    Mar. 24, 2016

Related U.S. Application Data

(63) Continuation-in-part of application No. 13/177,397, filed on Jul. 6, 2011, now abandoned.

(30) Foreign Application Priority Data

Dec. 23, 2010 (KR) .................. 10-2010-0133486

(51) Int. Cl.
*F21V 7/04*     (2006.01)
*F21V 8/00*     (2006.01)

(52) U.S. Cl.
CPC ......... *G02B 6/0021* (2013.01); *G02B 6/0085* (2013.01); *G02B 6/0091* (2013.01); *G02B 6/002* (2013.01); *G02B 6/0016* (2013.01)

(58) Field of Classification Search
CPC .. G02B 6/0021; G02B 6/0091; G02B 6/0086; G02B 6/0081
See application file for complete search history.

(56) References Cited

U.S. PATENT DOCUMENTS

| | | |
|---|---|---|
| 6,834,974 B2 | 12/2004 | Lee et al. |
| 7,360,937 B2 * | 4/2008 | Han .................. G02B 6/0026 257/E33.073 |
| 7,441,938 B2 | 10/2008 | Sakai et al. |
| 7,612,841 B2 | 11/2009 | Kim et al. |
| 7,944,527 B2 | 5/2011 | Jeon et al. |
| 8,057,087 B2 | 11/2011 | Chang |
| 8,454,219 B2 | 6/2013 | Byoun et al. |
| 8,622,601 B2 | 1/2014 | Zheng et al. |
| 8,628,255 B2 | 1/2014 | Li |
| 8,749,729 B2 | 6/2014 | Sasaki et al. |
| 2003/0147257 A1 | 8/2003 | Lee |

(Continued)

FOREIGN PATENT DOCUMENTS

| | | |
|---|---|---|
| CN | 101922660 | 12/2010 |
| JP | 2007-335396 | 12/2007 |

(Continued)

*Primary Examiner* — William N Harris
(74) *Attorney, Agent, or Firm* — Innovation Counsel LLP

(57) ABSTRACT

A spacer member is provided within a display apparatus that includes a heat-emitting light source and a thermally deformable light guide plate. In one embodiment, the spacer member includes a pair of spacer members disposed at sides of the light source and engaging the light guide plate so as to space the light source from a light receiving incident surface of the PGP by a predetermined distance.

11 Claims, 8 Drawing Sheets

(56) References Cited

U.S. PATENT DOCUMENTS

| | | | |
|---|---|---|---|
| 2005/0141244 A1 | 6/2005 | Hamada et al. | |
| 2006/0007704 A1* | 1/2006 | Mori | G02B 6/0013 |
| | | | 362/613 |
| 2006/0176712 A1 | 8/2006 | Takada | |
| 2006/0239029 A1 | 10/2006 | Yu | |
| 2006/0245207 A1 | 11/2006 | Ogino et al. | |
| 2006/0256254 A1 | 11/2006 | Park et al. | |
| 2007/0008739 A1* | 1/2007 | Kim | G02B 6/0021 |
| | | | 362/612 |
| 2007/0263407 A1* | 11/2007 | Sakai | G02B 6/0021 |
| | | | 362/608 |
| 2008/0186733 A1* | 8/2008 | Ho | G02B 6/0021 |
| | | | 362/610 |
| 2010/0135043 A1 | 6/2010 | Wang et al. | |
| 2010/0165239 A1 | 7/2010 | Lee et al. | |
| 2010/0290246 A1* | 11/2010 | Kim | G02B 6/002 |
| | | | 362/602 |
| 2011/0286237 A1* | 11/2011 | Tanoue | G02B 6/0016 |
| | | | 362/606 |

FOREIGN PATENT DOCUMENTS

| | | |
|---|---|---|
| JP | 2008-047832 | 2/2008 |
| JP | 2010-092683 | 4/2010 |
| KR | 10-2000-0009876 | 2/2000 |
| KR | 10-2007-0076496 | 7/2007 |
| KR | 10-2008-0005759 | 1/2008 |
| KR | 10-2008-0006052 | 1/2008 |
| KR | 10-2009-0055456 | 6/2009 |
| KR | 10-2009-0058612 | 10/2009 |
| KR | 10-2010-0061326 | 6/2010 |
| KR | 10-2010-0108188 | 10/2010 |

* cited by examiner

DISPLAY APPARATUS HAVING THERMALLY PROTECTED BACKLIGHT ASSEMBLY

CROSS-REFERENCE TO RELATED APPLICATION

This is a continuation-in-part application based on pending application Ser. No. 13/177,397, filed Jul. 6, 2011, the entire contents of which is hereby incorporated by reference.

Korean Patent Application No. 10-2010-0133486 filed on Dec. 23, 2010, in the Korean Patent Office, and entitled: "DISPLAY APPARATUS HAVING THERMALLY PROTECTED BACKLIGHT ASSEMBLY," is incorporated by reference herein in its entirety.

BACKGROUND

1. Field of Disclosure

The present disclosure of invention relates to a display apparatus having a backlight assembly.

2. Description of Related Technology

Recently, backlight assemblies including light emitting diodes (LED's) as light-generating sources have been developed for use in display apparatus having the backlight assembly as their light sources.

Such LED-based backlight assemblies can emit light (e.g., white light) having high brightness while reducing power consumption and minimizing consumed volume as compared with backlight assemblies that used the older cold cathode fluorescent lamp (CCFL) technology.

However, when LED's are employed in the backlight assembly as a light source, the internal temperature of the backlight assembly may rise due to heat generated from the LED's and thermally conducted to internal other parts of the of the backlight assembly. If the internal temperature of the backlight assembly rises, the light efficiency of the LED's may be lowered and an adjacent light guide plate (edge-lit light guide plate) may be physically deformed due to thermal deformation effects. Such undesired deformation of the light guide plate may cause a stain to an image so that the quality of the image may be deteriorated.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a display apparatus having a backlight assembly capable of avoiding or reducing thermal conduction of heat from discrete light sources such as LED's to other internal parts of the backlight assembly and thus avoiding or reducing deformation of the other internal parts and corresponding degradation of display quality.

In accordance with one aspect of the present disclosure, a display apparatus includes a light source that emits heat as well supplying light for the display apparatus, a light guide plate receiving the light through at least one incident surface thereof, the light guide plate outputting the light through a top surface thereof, and a display panel displaying an image by using the output light. A spacer member disposed within the display apparatus to engage directly or indirectly with the light source and the light guide plate so as to provide a predetermined thermal separation spacing between the light source and the at least one incident surface of the light guide plate. The spacer member may include a pair of spaced apart spacer members provided adjacent to sides of the light source and engaging with the light guide plate so as to thereby space the light source by a predetermined distance away from the incident surface of the light guide plate.

As described above, the light source is spaced apart from the light guide plate in the backlight assembly so that heat generated from the light source may not be transferred to the light guide plate. As a result, the light guide plate may not be melted by the heat generated from the light source, so that the display quality of the display apparatus can be improved. Other aspects of the disclosure will become cleared from the below provided, detailed description.

BRIEF DESCRIPTION OF THE DRAWINGS

The above and other advantages of the present disclosure of invention will become readily apparent by reference to the following detailed description when considered in conjunction with the accompanying drawings wherein.

DETAILED DESCRIPTION

Figure 1:
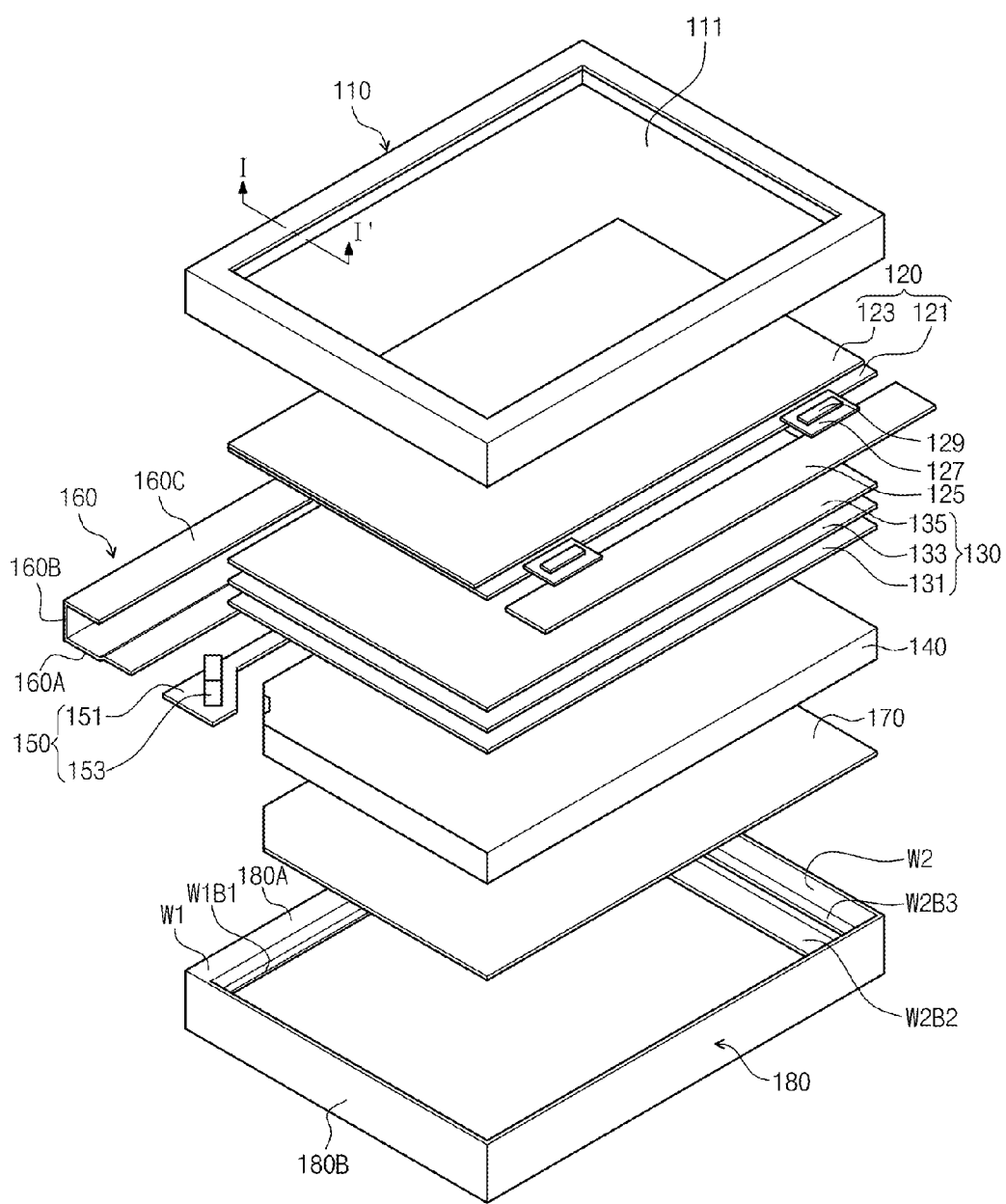
FIG. 1 is an exploded perspective view showing a display apparatus according to a first embodiment in accordance with the present disclosure.

The here presented embodiments can be modified in various forms and as such should not be seen as limiting the present teachings. Instead the following embodiments are provided to clarify the technical spirit and scope of teachings provided here and to sufficiently transmit the technical spirit of the present teachings to those having ordinary knowledge and skill in the relevant field of art.

When describing each attached drawing, similar reference numerals are designated as similar components. In addition, the size of the layers and regions of the attached drawings along with the following embodiments are simplified or exaggerated for precise explanation or emphasis and the same reference numeral represents the same component. The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present teachings. Similarly, the second component may be named as the first component. The expression of the singular number in the specification includes the meaning of the plural number unless the meaning of the singular number is definitely different from that of the plural number in the context.

In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

Hereinafter, exemplary embodiments will be described in detail with reference to accompanying drawings.

Figure 2:
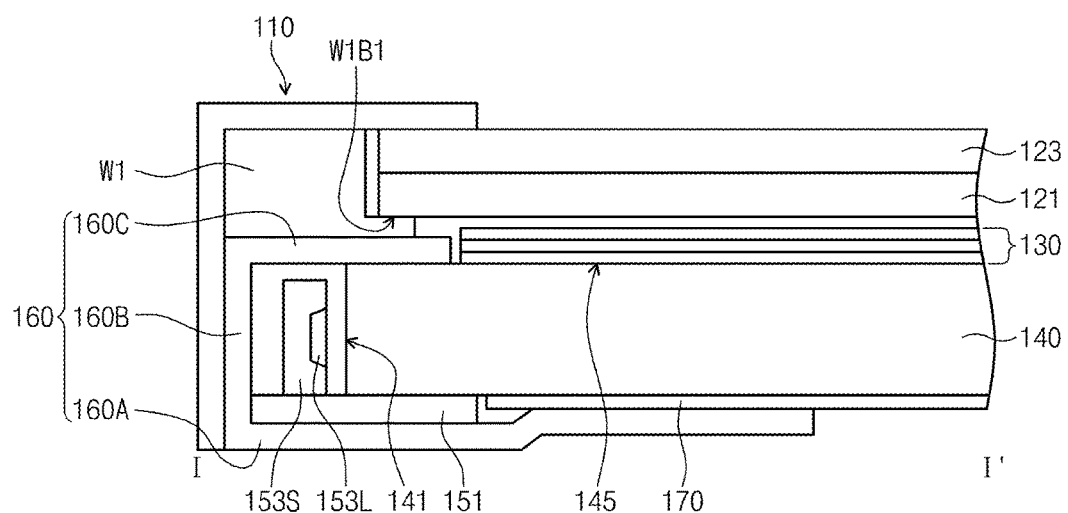
FIG. 2 is a sectional view taken along line I-I' of FIG. 1 when the display apparatus is assembled.

FIG. 1 is a perspective view of an exploded assembly showing a display apparatus 100 according to a first embodiment. FIG. 2 is a sectional view taken along line I-I' of FIG. 1 when the display apparatus is assembled.

Referring to FIGS. 1 and 2, the display apparatus includes a display panel 120, a backlight assembly and a top chassis 110. The display panel 120 is structured to display an image in accordance with supplied image-defining signals. The display panel 120 is a non-emissive display panel and may use various types of display technologies, such as liquid crystal display (LCD) technology, electrophoretic display technology, electrowetting display technology, and microelectromechanical system (MEMs) display technology. In the exemplary first embodiment, the LCD panel technology is used for the display panel.

The display panel 120 has a rectangular plate shape having long lateral sides and comparatively shorter lateral sides. The display panel 120 includes an array substrate 121 having a plurality of pixel units disposed thereon, an opposite substrate 123 facing the array substrate 121 and a liquid crystal layer (not shown) interposed between the array substrate 121 and the opposite substrate 123. In addition, the array substrate 121 is provided thereon with a plurality of gate lines (not shown) extending in the row direction and a plurality of data lines (not shown) extending in the column direction. A plurality of pixel areas are defined on the array substrate 121 in the form of a matrix and a plurality of pixel units are provided corresponding to the respective pixel areas.

Each pixel unit (not shown) includes a thin film transistor (TFT) and a pixel electrode. A gate electrode of the TFT is connected to a corresponding gate line of the gate lines, a source electrode of the TFT is connected to a corresponding data line of the data lines, and a drain electrode of the TFT is connected with the pixel electrode. The TFT operates as a switching element for selectively coupling a voltage on the associated data line to the pixel-electrode at an appropriate time (e.g., during a row-scanning 1H period).

The opposite substrate 123 may include RGB color filters (and/or otherwise colored filters) corresponding to the pixels. The opposite substrate 123 further includes a common electrode (not shown) formed on the RGB color filters while facing the pixel electrodes. Molecules of the liquid crystal layer may be aligned in specific directions according to electric fields that are selectively formed between the pixel electrode and the common electrode, thereby adjusting transmittance of the light supplied from the backlight assembly.

The display panel 120 can be provided thereon with a driving chip 129 to supply a driving signal, a tape carrier package (TCP) 127 on which the driving chip 129 is mounted, and a printed circuit board (PCB) 125 electrically connected to the display panel 120 through the TCP 127.

The driving chip 129 generates line driving signals in response to an external signal to drive the display panel 120. The external signal is supplied from the PCB 125 and includes an image signal, various control signals, and driving voltage.

A gate signal and a data signal are typically necessary for causing the LCD display panel 120 to display the image. The driving chip 129 includes a data lines driver (not shown), which converts the image signal into corresponding data line signals which are transmitted along the data lines of the display panel 120. According to one embodiment, a gate lines driver (not shown), which generates the gate signals, is directly integrally formed on the array substrate 121. According to another embodiment, the gate lines driver is prepared as a chip and mounted on the array substrate 121 or the TCP 127.

The backlight assembly is provided below the display panel 120 in order to supply light to the display panel 120. The backlight assembly may include a light source unit 150, a back cover 160, a light guide plate 140, a spacer member 141P which for example may be integrally formed as part of the light guide plate 140, an optical sheet 130, a reflective sheet 170, and a mold frame 180.

The light source unit 150 supplies the light to the display panel 120. The light source unit 150 includes one or more discrete light sources 153 which are structured to generate backlighting light and a circuit board 151 on which the light source(s) 153 are mounted. As will be explored in more detail herein, the one or more discrete light sources 153 can act as sources of undesired heat as well as sources of desired light.

In the illustrative example 100, the back cover 160 is bent to surround the light source unit 150 so as to have a generally C-shaped cross section where one side of the C-shaped cross section of the back cover 160 is open for transmitting light. The back cover 160 may include a reflective material, such as aluminum (Al), to reflect the light generated from the light source 153 and received therefrom directly or indirectly through the opening of the back cover and toward a light receiving surface of the light guide plate 140.

More specifically, the back cover 160 includes a lower or base section 160A, an overhanging upper or covering part 160C that extends parallel to the base section 160A, and a lateral side 160B connecting the base section 160A to the cover part 160C. The circuit board 151 is disposed on the base section 160A and aligned to an aligning feature of the back cover 160. The cover part 160C faces the base 160A while defining a space for receiving the circuit board 151 and its mounted components, where the latter include the light source 153.

The light guide plate 140 has a substantially rectangular plate shape and includes a transparent material that refracts light at least in the wavelength ranges used by the display panel. The light guide plate 140 may include a transparent polymer resin, such as polycarbonate or polymethyl methacrylate.

The light guide plate 140 includes an incident surface 141 structured and disposed to receive incoming light such as that generated from the light source 153 or reflected from the reflective surfaces of the back cover 160. The light guide plate 140 further includes an upward facing exit surface 145 structured and disposed to output refracted and redirected light upwards toward the display panel 120. In detail, the light guide plate 140 guides the light generated from the light source 153 toward the display panel 120. One end of the light guide plate 140 is mounted on an upper end of the circuit board 151 such that the light source 153 faces the incident surface 141 and this end is inserted into the back cover 160.

The spacer member 141P is provided between the light source 153 and a light receiving section 141 of the light guide plate 140 so as to thereby thermally space the light source 153 apart from the incident surface 141.

The light unit 150, the light guide plate 140 and the spacer member 141P will be further described later in detail with reference to accompanying drawings.

The optical sheet 130 is provided between the light guide plate 140 and the display panel 120. The optical sheet 130 further controls the light generated from the light source unit 150. The optical sheet 130 may include a diffusion sheet 131, a prism sheet 133 and a protective sheet 135 sequentially stacked on the light guide plate 140. The diffusion sheet 131 diffuses the light. The prism sheet 133 focuses the light that has been diffused by the diffusion sheet 131 along a direction perpendicular to the plane of the display panel 120. Most of the light passing through the prism sheet 133 is made perpendicularly incident into the display panel 120. The protective sheet 135 is disposed above the prism sheet 133. The protective sheet 135 protects the prism sheet 133 from the external impact or scratching. According to the present embodiment, the optical sheet 130 includes one diffusion sheet 131, one prism sheet 133 and one protective sheet 135, but the present teachings are not limited thereto. According to another embodiment, at least one of the diffusion sheet 131, the prism sheet 133 and the protective sheet 135 of the optical sheet 130 may be provided in plural form. In this case, the plural sheets overlap with each other in use.

The reflective sheet 170 is provided below the light guide plate 140 to reflect light which is leaked downward rather than being directed upwardly to the display panel 120.

The mold frame 180 has a rectangular annular shape. The mold frame 180 includes a first part 180A having a linear shape and such is provided at a region corresponding to a region where the back cover 160 is provided, so as to receive the back cover 160. The mold frame 180 further includes a second part 180B connected to the first part 180A. The first part 180A includes a first sidewall W1 disposed to be coplanar with the cover part 160C of the back cover 160, and a first bottom portion W1B1 extending from a lower end of the first sidewall W1. The second part 180B includes a second sidewall W2, a second bottom portion W2B2 extending from a lower end of the second sidewall W2, and a third bottom portion W2B3 having a top surface extending from the second sidewall W2 in line with a top surface of the first bottom portion W1B1. Thus, the mold frame 180 is provided with a first receiving space defined by the first and second sidewalls W1 and W2 and the first and third bottom portions W1B1 and W2B3, and a second receiving space defined by the first and second sidewalls W1 and W2 and the first and second bottom portions W1B1 and W2B2. The display panel 120 is received in the first receiving space and the back cover 160, the light source unit 150, the optical sheet 130, the light guide plate 140 and the reflective sheet 170 are received in the second receiving space.

The top chassis 110 is provided above the display panel 120. The top chassis 110 supports a front edge of the display panel 120 and is formed with a display window 111 to optically expose a display area of the display panel 120.

Figure 3:
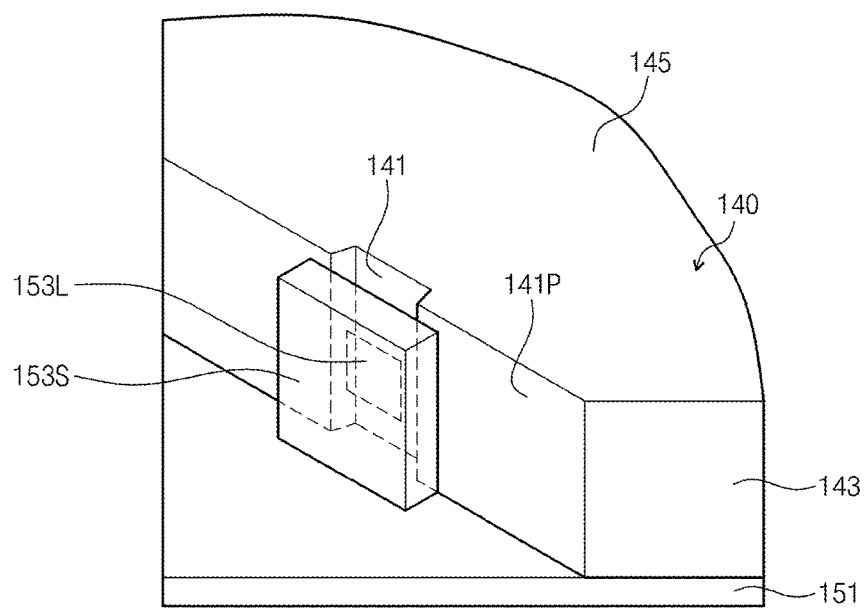
FIG. 3 is a perspective view showing a light source unit and a light guide plate of a backlight assembly employed in the display apparatus according to the first embodiment.

FIG. 3 is a perspective view showing the light source unit 150 and the light guide plate 140 of the backlight assembly employed in the display apparatus according to the first embodiment of FIG. 1.

The light source 153 is vertically mounted on the circuit board 151 at an angle and connected to wiring of the circuit board for generating light by receiving driving power through the circuit board 151. Although not shown in the drawings, the circuit board 151 is electrically connected to a power supply (not shown) to transfer the driving power from the power supply to the light source 153.

The circuit board 151 may include at least one of a flexible printed circuit (FPC), a dual FPC or a metal PCB.

The light source 153 includes a light emission front surface 153F (see, FIG. 4) to emit the light. The light source 153 includes a light source device 153L, such as a packaged LED, and a support part 153S to aligningly support the light source device 153L relative to the board and the light guide plate 140. The light source device 153L is provided at the light emission surface 153F to emit the light. The light source device 153L may be buried in the support part 153S. In this case, the light source device 153L supplies the light from one side (and light guide plate facing side) of the support section 153S.

The illustrated light guide plate 140 has a substantially hexahedral shape, in which top and bottom major surfaces are aligned in parallel to the display panel 120. The light guide plate 140 may have at least one corner part, which is formed by chamfering at least one edge adjacent to the light source 153 as shown. The light emitted from the light source 153 is incident into the chamfered corner part, so the chamfered corner part may serve as an incident surface 141. As the light is incident into the incident surface 140, the light guide plate 140 guides and redirects the light to exit toward the top surface of the light guide plate 140, so the top surface of the light guide plate 140 may serve as an exit surface 145. In one embodiment, lateral sides 143 of the light guide plate 140 except for the incident surface 141 directly make contact with the back cover 160 or the mold frame 180 and are received or mounted in the back cover 160 or the mold frame 180. Thus, the light guide plate 140 can be prevented from being fluctuated even if external impact is applied thereto thanks to a stiffness provided by the back cover 160 and/or the mold frame 180.

The spacer member 141P is provided between the light source 153 and the light guide plate 140 and has a predetermined thickness.

According to the first embodiment, the spacer member 141P is integrally formed as a monolithic part of the light guide plate 140, but the present disclosure is not limited thereto. The spacer member 141P and the light guide plate 140 are provided as one body. According to another embodiment, the spacer member 141P can be provided between the light source 153 and the light guide plate 140 separately from the light guide plate 140.

The spacer member 141P is provided at both sides of the incident surface 141 of the light guide plate 140. If the spacer member 141P is integrally formed with the light guide plate 140, the spacer member 141P protrudes from both sides of the incident surface 141 of the light guide plate 140 by a predetermined thickness. The spacer member 141P has a front surface, which is parallel to the incident surface 141 and facing opposite to (outwardly relative to) the inwardly facing light emission surface 153F. The front surface of the spacer member 141P makes contact with the light source support part 153S. In other words, the spacer member 141P makes contact with a portion of the support part 153S other than the light source device 153L itself, so the light emitted from the light source device 153L can be incident into the incident surface 141 without light loss (and also so that the spacer member 141P is not in direct thermal contact with the light source device 153L).

Figure 4:
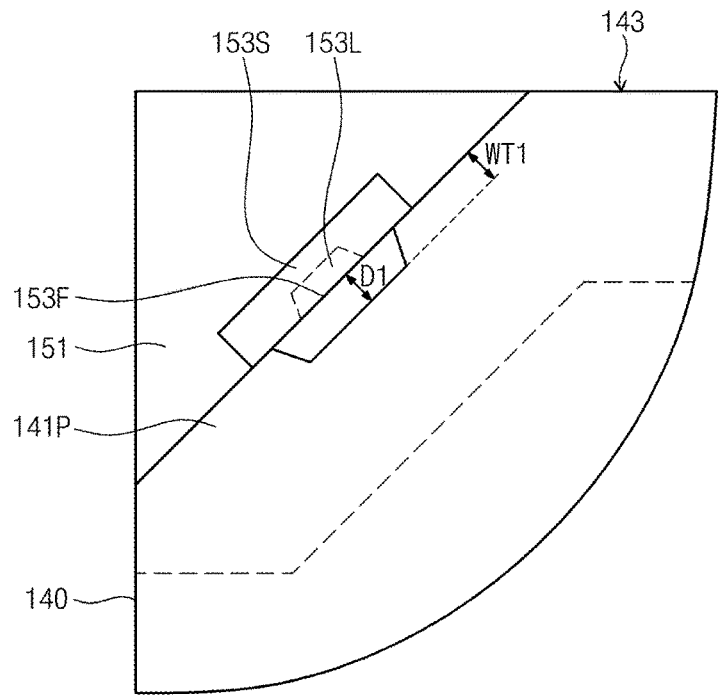
FIG. 4 is a plan view of FIG. 3.

If the spacer member 141P has a first thickness WT1, the spacer member 141P protrudes from the incident surface 141 of the light guide plate 140 by the first thickness WT1 and the incident surface 141 is spaced apart from the light emission surface 153F by a first distance D1 corresponding to the first thickness WT1 as shown in FIG. 4.

According to the first embodiment, since the light emission surface 153F is spaced apart from the incident surface 141, the heat generated from the light source device 153L may not be directly transferred to the incident surface 141. Thus, the light guide plate 140 can be prevented from being melted or deformed due to the heat generated from the light source device 153L being directly thermally coupled to the incident surface 141.

While according to the illustrated first embodiment, the light source 153 is provided in multiplicity at two opposed edges of the light guide plate 140, the present disclosure is not limited thereto. According to another embodiment, only one light source 153 is provided at one edge of the light guide plate 140 or at least three light sources 153 are provided at edges of the light guide plate 140. Further, a plurality of light sources 153 can be provided in opposition to the incident surface 141.

Hereinafter, other exemplary embodiments of the present disclosure will be described. The following description will be focused on the difference with respect to the first embodiment in order to avoid redundancy. In addition, the same reference numerals will be used to refer to the same elements.

Figure 5:
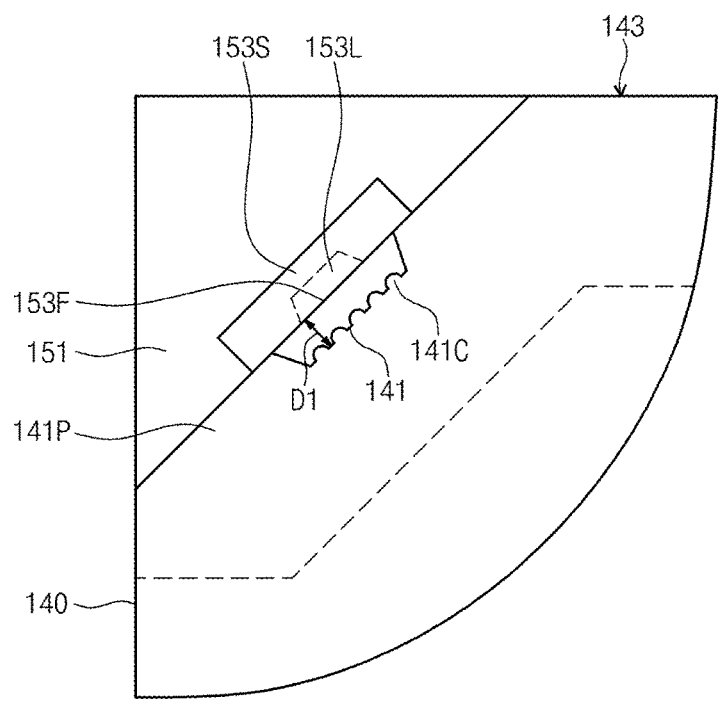
FIG. 5 is a plan view showing a light source unit and a light guide plate of a backlight assembly employed in a display apparatus according to the second embodiment.

FIG. 5 is a plan view showing a light source unit 150 and a light guide plate 140 of a backlight assembly employed in a display apparatus according to the second embodiment.

Referring to FIG. 5, the incident surface 141 includes a plurality of protrusions 141C protruding from the incident surface 141. The protrusions 141C extend from the top surface to the bottom surface of the light guide plate 140. The protrusions 141C diffuse the light, which is emitted from the light emission surface 153F and directed toward the light guide plate 140 through the incident surface 141. As a result, the light can be uniformly supplied over the whole area of the light guide plate 140 by the protrusions 141C. A distance between two adjacent protrusions 141C can be adjusted depending on the size of the incident surface 141 or the light emission surface 153F. In addition, the height of the protrusions 141C can be adjusted according to the distance between two adjacent protrusions 141C. In one embodiment, the protrusions 141C are in the form of elliptical lenticular lenses or half-cylinder lenses.

Figure 6:
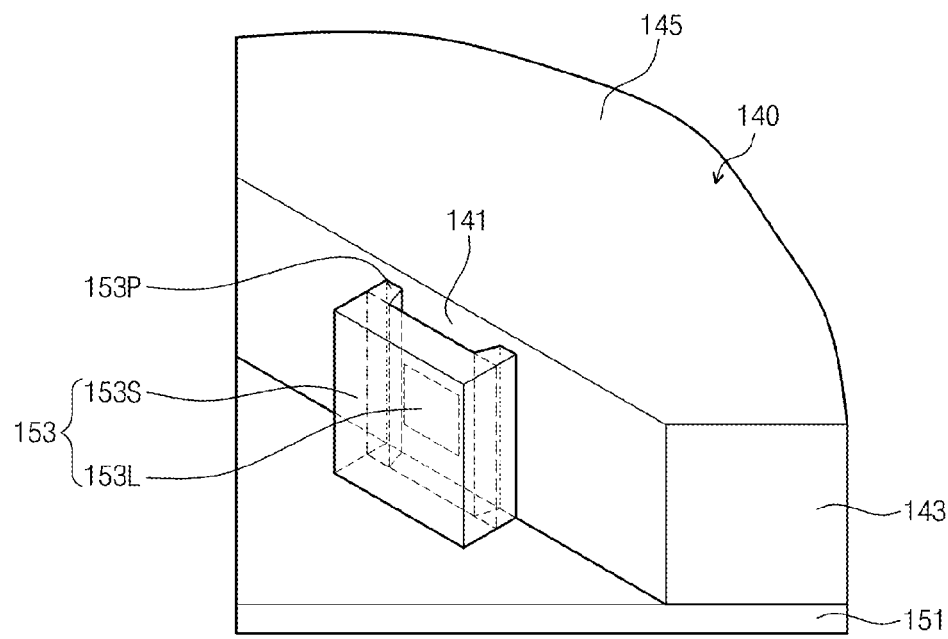
FIG. 6 is a perspective view showing a light source unit and a light guide plate of a backlight assembly employed in a display apparatus according to the third embodiment.
Figure 7:
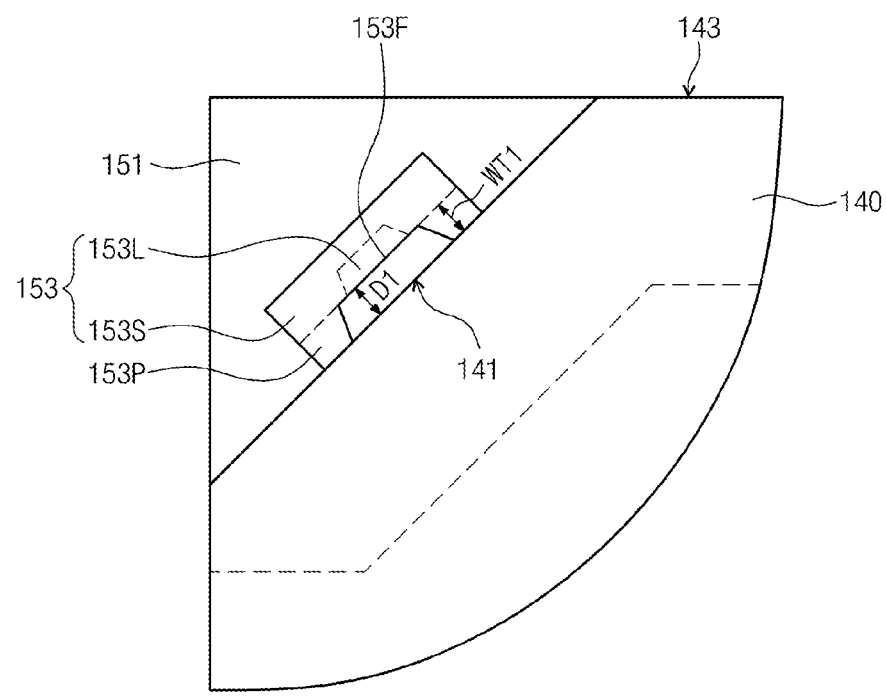
FIG. 7 is a plan view of FIG. 6.

Thus, according to alternate embodiments of the present disclosure, the surface of the incident surface 141 can be variously modified. Additionally, the spacer member 141P can be variously modified. FIG. 6 is a perspective view showing a light source unit 150 and a light guide plate 140 of a backlight assembly employed in a display apparatus according to the third embodiment. FIG. 7 is a top plan view of FIG. 6.

Referring to FIGS. 6 and 7, here a spacer member 153P is integrally provided as part of the support part 153S and so as to define a thermal separation space interposed between the light source device 153L and the light guide plate 140. The spacer member 153P and the support part 153S are provided as one body. According to the third embodiment, the spacer member 153P is integrally formed as part of the light source assembly 153, but the present disclosure is not limited thereto. According to another embodiment, the spacer member 153P can be separately provided between the light source 153 and the light guide plate 140.

The spacer member 153P is disposed on the support part 153S while interposing a thermal separation space between the light source device 153L and the light guide plate 140. If the spacer member 153P is integrally formed with the support part 153S, the spacer member 153P protrudes from the support part 153S at both sides of the light source device 153L by a predetermined thickness. The spacer member 153P has a front surface, which is parallel to the light emission surface 153F and opposite to the incident surface 141. The front surface of the spacer member 153P makes contact at both thereof sides of the incident surface 141 of the light guide plate 140. The spacer member 153P is provided on the support part 153S, so the light emitted from the light source device 153L can be incident into the incident surface 141 without light loss.

The support part 153S may have a recess, The light source device 153L settled in the recess.

If the spacer member 153P has a first thickness WT1, the spacer member 153P protrudes from the light emission surface 153F by the first thickness WT1 and the light emission surface 153F is spaced apart from the incident surface 141 by a first distance D1 corresponding to the first thickness WT1.

As a result, according to the third embodiment, since the light emission surface 153F is spaced apart from the incident surface 141, the heat generated from the light source device 153L may not be directly transferred to the incident surface 141.

Figure 8:
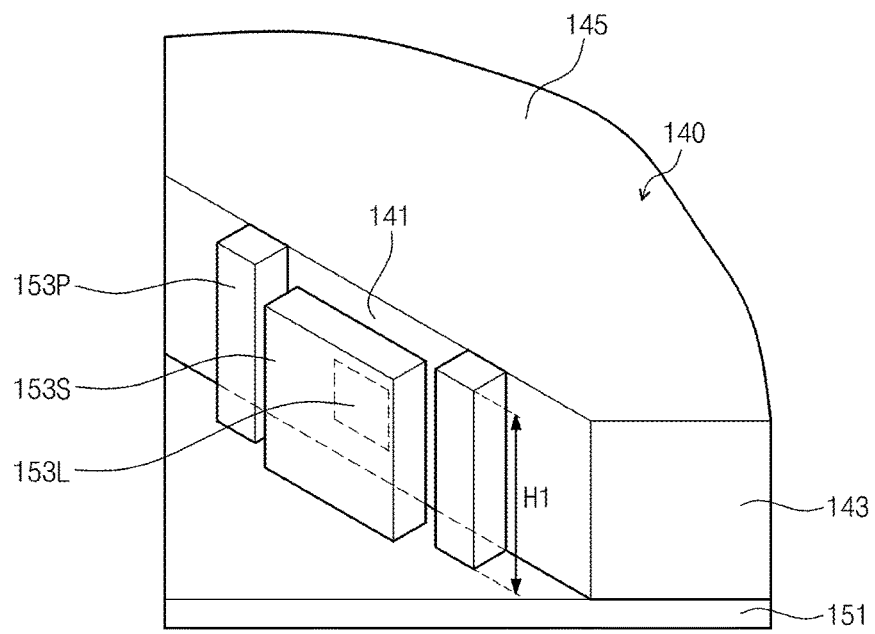
FIG. 8 is a perspective view showing a light source unit and a light guide plate of a backlight assembly employed in a display apparatus according to the fourth embodiment.
Figure 9:
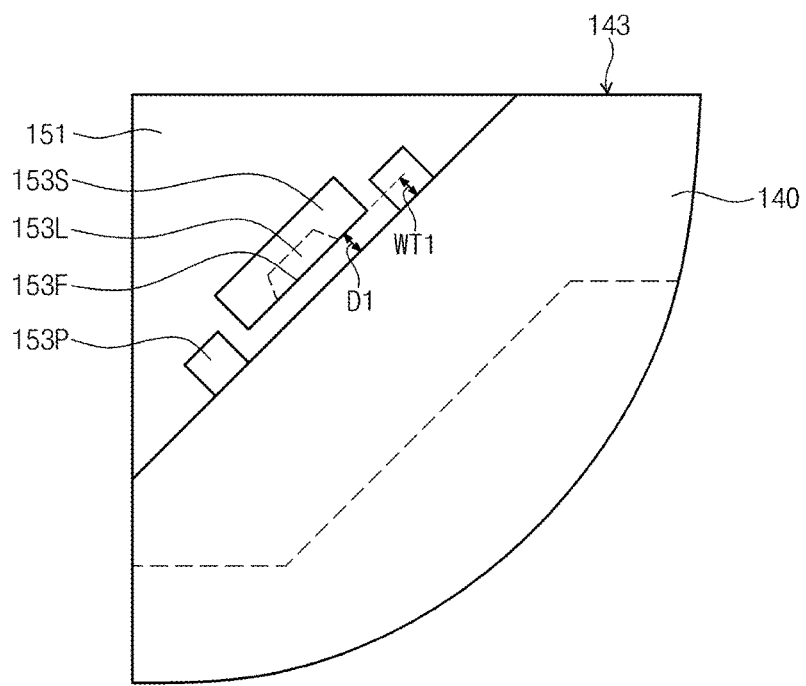
FIG. 9 is a plan view of FIG. 8.

FIG. 8 is a perspective view showing a light source unit 150 and a light guide plate 140 of a backlight assembly employed in a display apparatus according to the fourth embodiment. FIG. 9 is a top plan view of FIG. 8.

Referring to FIGS. 8 and 9, the light source unit 150 includes a circuit board 151, a light source 153 mounted on one area of the circuit board 151 and one or more spacer members 153P are alignably provided on other areas of the circuit board 151 such that the on-board spacer members 153P rather than the on-board light source assembly 153 directly contact the light guide plate 140. In the case of two spacer member posts 153P extending vertically from the circuit board 151, these may be provided at both sides of the support part 153S while interposing the light source device 153L therebetween. In one embodiment, the one or more spacer members 153P are spaced apart from the support part 153S and each has a rectangular column shape. Other shapes are of course possible including a cylindrical post shape or a triangular truss shape.

The spacer member 153P has a front surface, which is opposite to the incident surface 141 of the light guide plate 140 and parallel to the light emission surface 153F. The front surface of the spacer member 153P protrudes from an extension plane of the light emission surface 153F toward the incident surface 141 by a first interval W1. The front surface of the spacer member 153P makes contact with the incident surface 141, so that the light emission surface 153F is caused thereby to be thermally spaced apart from the incident surface 141 by a first distance D1 corresponding to the first interval W1.

The spacer member 153P may include a material having superior thermal conductivity, such as a metal. If the spacer member 153P includes the heat conductive material, the spacer member 153P can effectively transfer the heat, which is generated from the light source 153, to the circuit board 151 for dissipation of the heat by the circuit board, for example through a metallic ground plane of the circuit board. The circuit board 151 directly makes contact with the base 160A of the back cover 160 to transfer the heat to the back cover 160 for further dissipation by the back cover 160. In other words, all of the spacer member 153P, circuit board 151 and back cover 160 may be in thermally conductive contact with one another where each includes a material having superior thermal conductivity and thus all these parts may cooperate in conducting heat energy away from the light guide plate 140 and towards radiating surfaces from which the heat energy can be dissipated into the ambient (e.g., into surrounding air).

The space member 153P may have the height ranging from the bottom surface to the top surface of the light guide plate 140. In detail, one side of the back cover 160 is open to receive one end portions of the light source unit 150 and the light guide plate 140. Thus, the distance between the base 160A and the cover part 160C of the back cover 160 may correspond to the distance between the bottom surface and the top surface of the light guide plate 140. If the height of the spacer member 153P is equal to the distance between the bottom surface and the top surface of the light guide plate 140, the spacer member 153P directly makes contact (thermal contact) with the upper cover part 160C of the back cover 160. Since the spacer member 153P includes the material having the superior thermal conductivity, the spacer member 153P directly transfers the heat to the back cover 160, thereby dissipating the heat generated from the light source 153. In particular, if the spacer member 153P is made from aluminum having the high thermal conductivity, the heat can be effectively dissipated out of the backlight assembly through the spacer member 153P and then out through the back cover 160.

According to the fourth embodiment, the spacer member 153P has the rectangular column shape, but the present disclosure is not limited thereto. The spacer member 153P may have various shapes if the spacer member 153P can extend from the extension plane of the light emission surface 153F of the light source 153 to the incident surface 141 to maintain the distance between the light emission surface 153F and the incident surface 141. For instance, the spacer member 153P may have a cylindrical shape.

As described above, according to the fourth embodiment, the heat can be substantially transferred through the cover part 160C of the back cover 160 as well as the base 160A of the back cover 160 due to the heat conducting properties of the spacer member 153P. Therefore, the internal temperature of the backlight assembly may not rise by the heat generated from the light source 153, so that the light guide plate 140 can be prevented from being bent or melted. In addition, since the heat generated from the light source 153 can be instantly dissipated to the outside, an additional heat radiation member is not necessary. A thermal pad or a thermal tape may additionally be provided at the lower portion of the circuit board 151 of the light source unit 150 to dissipate the heat at the region between the light source unit 150 and peripheral elements of the light source unit 150. However, if the thermal pad or a thermal tape is provided at the lower portion of the circuit board 151 of the light source unit 150, the heat transfer path is complicated, so that thermal resistance may be increased by about 30° C./W. However, according to the present disclosure, the heat can be effectively dissipated without need for the thermal pad or the thermal tape.

Figure 10:
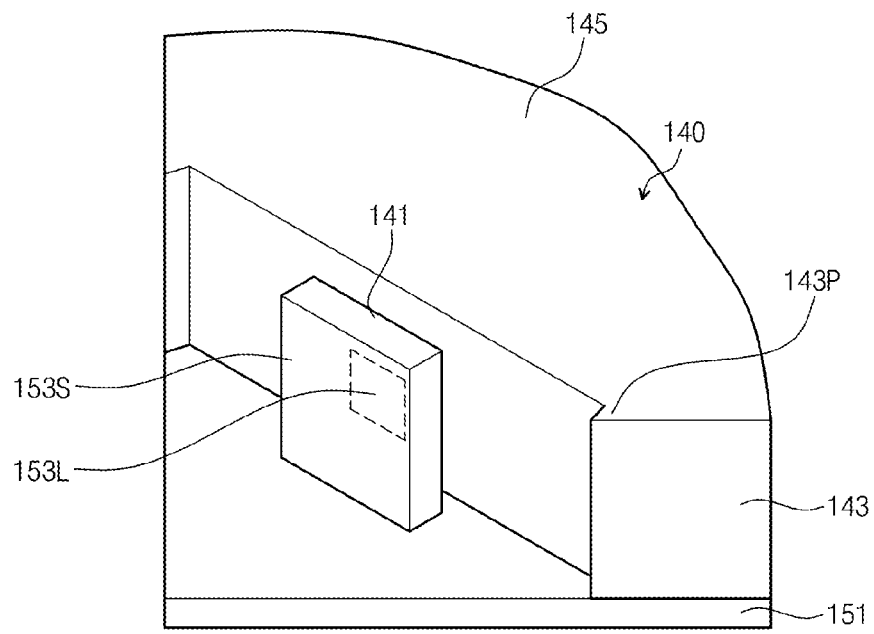
FIG. 10 is a perspective view showing a light source unit and a light guide plate of a backlight assembly employed in a display apparatus according to the fifth embodiment.
Figure 11:
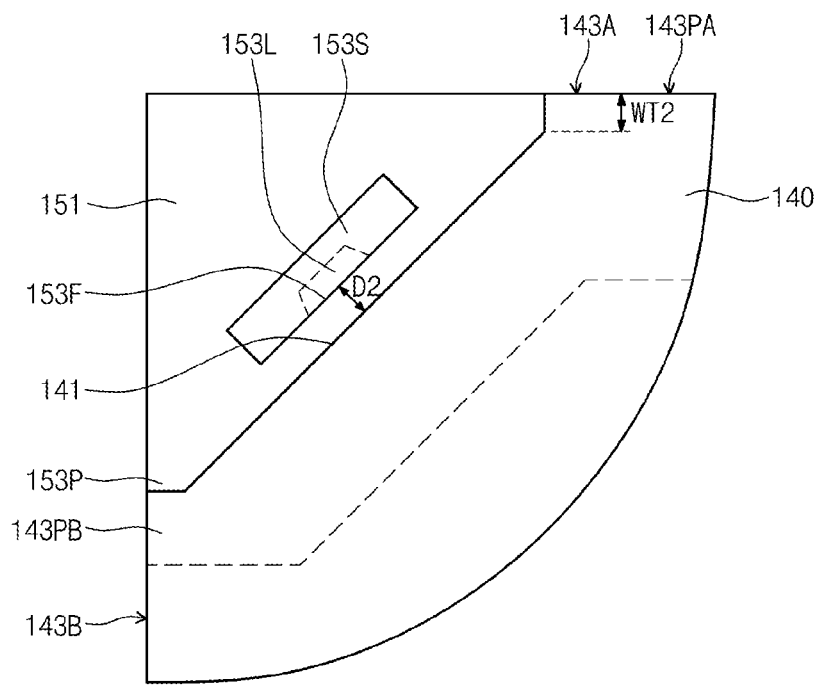
FIG. 11 is a plan view of FIG. 10.

FIG. 10 is a perspective view showing a light source unit 150 and a light guide plate 140 of a backlight assembly employed in a display apparatus according to a fifth embodiment. FIG. 11 is a top plan view of FIG. 10.

Referring to FIGS. 10 and 11, spacer members 143A and 143B are provided at lateral sides 143PA and 143PB of the light guide plate 140, which lateral sides 143PA and 143PB are connected to the corner chamfer style incident surface 141. The spacer members 143A and 143B are integrally formed with the light guide plate 140, but the present disclosure is not limited thereto. For instance, the spacer members 143A and 143B may make contact with the lateral side of the light guide plate 140 while being provided separately from the light guide plate 140.

If the lateral side connected to the incident surface 141 at one side of the incident surface 141 is referred to as a first lateral side 143PA and the lateral side connected to the incident surface 141 at the other side of the incident surface 141 is referred to as a second lateral side 143PB, the spacer members 143A and 143B may include a first spacer member 143A protruding from the first lateral side 143PA and a second spacer member 143B protruding from the second lateral side 143PB. The first spacer member 143A and the second spacer member 143B have outer surfaces parallel to the first and second lateral surfaces 143PA and 143PB. During assembly, the first and second lateral surfaces, 143PA and 143PB, engage with the interior walls W1B1, W2B2 of the mold frame 180. The circuit board 151 also engages with the interior walls W1B1, W2B2 of the mold frame 180. A thermal separation space is thereby defined as between the support part 153S affixed to the circuit board and the light guide plate 140 having the first spacer member 143A and the second spacer member 143B.

In other words, since the outer surface of the first spacer member 143A makes contact with a registration surface of at least one of the mold frame 180 and the back cover 160 since and the outer surface of the second spacer member 143B makes contact with a second registration surface of at least one of the mold frame 180 and the back cover 160, the light guide plate 140 is alignably disposed relative to at least one of the mold frame 180 and the back cover 160. The outer surface making contact with the back cover 160 is opposite to the lateral side 160B of the back cover 160. The outer surface making contact with the mold frame 180 is opposite to the first sidewall W1B1 of the mold frame 180. Thus, the first and second spacer members 143A and 143B and the light guide plate 140 are stably fixed by the mold frame 180 and the back cover 160.

The first and second spacer members 143A and 143B protrude from the first and second lateral sides to have a second thickness WT2. Thus, the light emission surface 153F is spaced apart from the incident surface 141 by a second distance D2 corresponding to the second thickness WT2 due to affixation of the support part 153S to the similarly registered circuit board. The second distance D2 may not be exactly equal to the second thickness WT2, but correspond to the second thickness WT2. Thus, the second distance D2 can be adjusted by changing the second thickness WT2.

As a result, the first and second spacer members 143A and 143B are provided on the lateral side connected to the incident surface 141, other than the incident surface 141 itself. Thus, the light emission surface 153F of the light source 153 can be exposed as maximum as possible through the incident surface 141 and the incident surface 141 can be stably spaced apart from the light emission surface 153F of the light source 153 by the first and second spacer members 143A and 143B.

As described above, according to the fifth embodiment, the light emission surface 153F is spaced apart from the incident surface 141, so the heat generated from the light source device 153L may not be directly transferred to the incident surface 141. Thus, the light guide plate 140 can be prevented from being melted or deformed by the heat generated from the light source device 153L.

Figure 12:
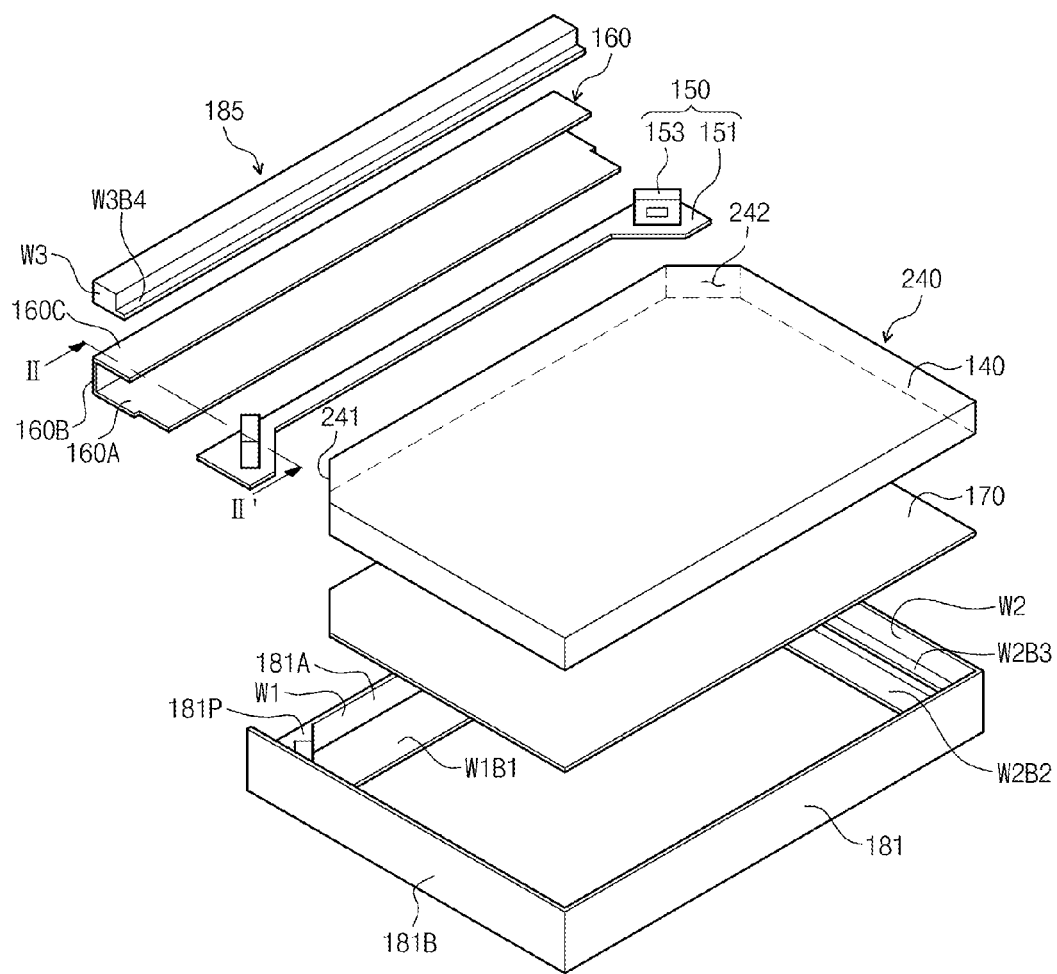
FIG. 12 is a perspective view showing a backlight assembly employed in a display apparatus according to the sixth embodiment.
Figure 13:
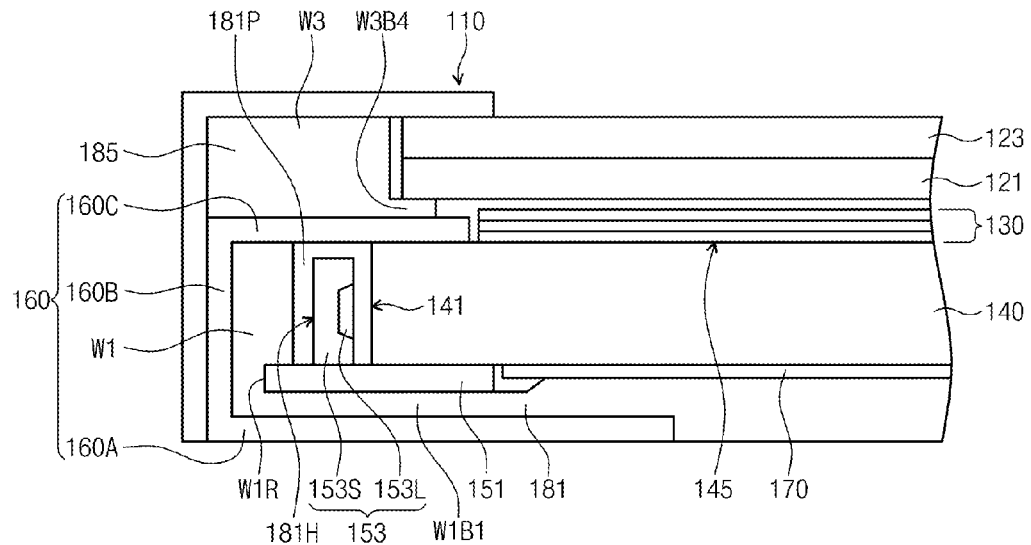
FIG. 13 is a sectional view taken along line II-II' of FIG. 12 to show the display apparatus including a display panel.

FIG. 12 is a perspective view showing a backlight assembly employed in a display apparatus according to a sixth embodiment. FIG. 13 is a sectional view taken along line II-II' of FIG. 12 to show the display apparatus including a display panel.

Referring to FIGS. 12 and 13, the backlight assembly of the display apparatus according to the sixth embodiment includes a light source unit 150, a back cover 160, a light guide plate 140, an optical sheet 130 and a mold frame 180.

The mold frame 180 includes a first mold frame 181 and a second mold frame 185.

The first mold frame 181 has a rectangular ring shape. The first mold frame 181 includes a first part 181A formed at a region corresponding to a region where the back cover 160 is provided and serving as one lateral side of the rectangular ring, and a second part 181B connected to the first part 181A.

The first part 181A is accommodated in the back cover 160 and provided on the base 160A of the back cover 160. The first part 181A includes a first sidewall W1 making contact with the lateral side 160B of the back cover 160 and a first bottom portion W1B1 extending from the lower end of the first sidewall W1 to make contact with the base 160A of the back cover 160.

The second part 181B includes a second sidewall W2, a second bottom portion W2B2 extending from the lower end of the second sidewall W2 and having a top surface aligned coplanar with a top surface of the first bottom portion W1B1, and a third bottom portion W2B3 protruding from the second sidewall W2 at a predetermined height.

The second mold frame 185 is provided on the back cover 160 corresponding to one lateral side of the rectangle ring. The second mold frame 185 includes a third sidewall W3 and a fourth bottom portion W3B4 extending from the lower end of the third sidewall W3. The fourth bottom portion W3B4 is aligned coplanar with the third bottom portion W2B3 of the first mold frame 181.

The first and second parts 181A and 181B of the first mold frame 181 receive the reflective plate 170, the light guide plate 140 and the light source unit 150. The first and second bottom portions W1B1 and W2B2 make contact with the bottom surface of the reflective plate 170 to support the circuit board 151 and the reflective plate 170 from the bottoms thereof. The first mold frame 181 can be formed with a recess W1R into which the circuit board 151 of the light source unit 150 is inserted. In addition, the circuit board 151 is inserted into the recess W1R of the first mold frame 181.

The second mold frame 185 and the second part 181B of the first mold frame 181 receive the display panel 120. The third bottom portion W2B3 and the fourth bottom portion W3B4 make contact with the bottom surface of the display panel 120 to support the display panel 120 from the bottom surface of the display panel 120.

The back cover 160 is bent to surround the first part 181A of the mold frame 181 and the light source unit 150 and one side of the back cover 160 is open. The back cover 160 includes a base 160A, a cover part 160C parallel to the base 160A, and a lateral side 160B connecting the base 160A to the cover part 160C. The cover part 160C faces the base 160A while forming a space to receive the circuit board 151 and the light source 153 therebetween. The first part 181A of the first mold frame 181, the light source unit 150 and one end of the light guide plate 140 are received in the space. The first bottom portion W1B1 of the first mold frame 181 is mounted on the base 160A and the first sidewall W1 of the first mold frame 181 makes contact with the lateral side 160B.

Figure 14:
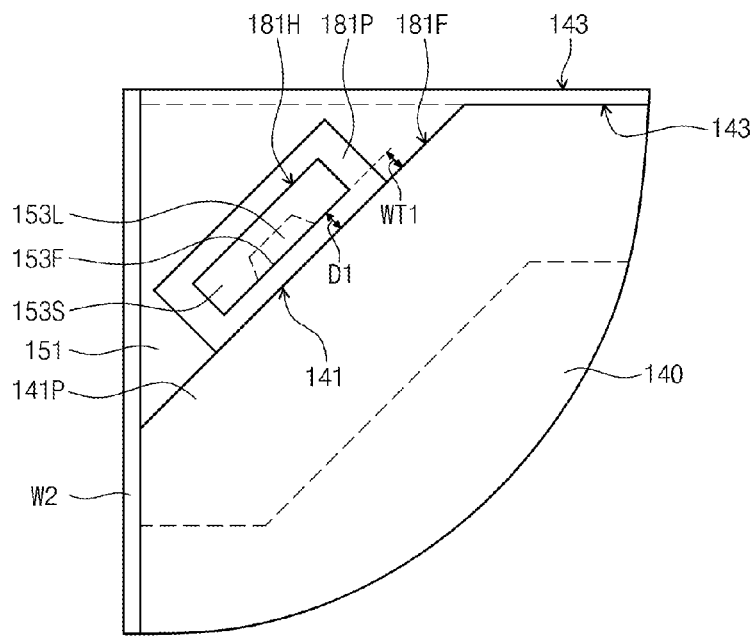
FIG. 14 is a plan view showing a light source unit, a mold frame and a light guide plate of the backlight assembly of FIG. 12.

FIG. 14 is a top plan view showing a light source unit 150, a mold frame 180 and a light guide plate 140 of the backlight assembly of FIG. 12.

Referring to FIG. 14, in the display apparatus according to the sixth embodiment, the first mold frame 181 is provided with a spacer section 181P, which is formed on the first mold frame 181 to provide a thermal separation space between the light source 153 from the light guide plate 140.

The space section 181P is provided adjacent to one side of the first part 181A of the first mold frame 181. In detail, the space section 181P is provided adjacent to the region where the light source 153 and the chamfered edge of the light guide plate 140 are provided. The space section 181P includes a contact surface 181F making contact with the incident surface 141 in opposition to the incident surface 141 of the light guide plate 140, and a recess 181H, which is recessed from the contact surface 181F to receive the light source 153 while providing a thermal separation space. The light emission surface 153F of the light source 153 is formed at the opening of the recess 181H, so that the light is incident into the incident surface 141.

The contact surface 181F of the spacer section 181P protrudes toward the incident surface 141 from a plane parallel to the light emission surface 153F. In detail, the contact surface 181F protrudes toward the incident surface 141 from an extension plane of the light emission surface 153F by a first thickness WT1. The contact surface 181F makes contact with both sides of the incident surface 141, so that the light emission surface 153F is thermally spaced apart from the incident surface 141 by a first distance D1 corresponding to the first thickness WT1.

When viewed from the top, the light source 153 is spaced apart from the first mold frame 181, but the present disclosure is not limited thereto. According to another embodiment, at least one lateral side of the light source 153 except for the light emission surface 153F can make contact with an inner wall of the recess 181H of the first mold frame 181. In this case, the light source 153 can be stably fixed in the recess 181H.

According to the sixth embodiment, the light emission surface 153F is spaced apart from the incident surface 141, so the heat generated from the light source device 153L is not directly transferred to the incident surface 141. Thus, the light guide plate 140 can be prevented from being melted or deformed by the heat generated from the light source device 153L.

Although the exemplary embodiments in accordance with the present teachings have been described, it is understood that the present disclosure should not be limited to these exemplary embodiments but various changes and modifications can be made by one ordinary skilled in the art in light of the present disclosure and within the spirit and scope of the present disclosure.

What is claimed is:

1. A display apparatus comprising:
    a light source including a support part and a light source device supported by the support part;
    a light guide plate that has an incident surface disposed and structured to receive a generated light from the light source device and has an output surface disposed and structured to output redirected light;
    a display panel disposed and structured to display an image using the redirected light;
    a spacer member disposed between the light guide plate and the support part in a first direction and directly contacting each of the light guide plate and the support part; and
    an air gap positioned between a light emission surface of the light source device and the incident surface in the first direction,
    wherein the light emission surface faces the incident surface, wherein an opposite surface of the light source device is completely positioned inside the support part and is opposite the light emission surface, and
    wherein a maximum thickness of the air gap in the first direction is equal to a maximum thickness of the spacer member in the first direction and is equal to a distance between the light emission surface and the incident surface in the first direction.

2. The display apparatus of claim 1, wherein the support part and the spacer member are provided as one body.

3. The display apparatus of claim 1, wherein the spacer member comprises a first spacer member and a second spacer member,
    wherein the second spacer member is separated apart from the first spacer member in a second direction across from the first direction.

4. The display apparatus of claim 1, wherein the support part has a recess,
    wherein the light source device is settled in the recess.

5. The display apparatus of claim 1, wherein the light source includes a first light source and a second first light source,
    wherein the light guide plate includes a first incident surface provided light from the first light source and a second incident surface provided light from the second light source and the second incident surface is separated apart from the first incident surface.

6. The display apparatus of claim 5, wherein the first incident surface and the second incident surface are not parallel.

7. The display apparatus of claim 1, wherein the light emission surface is parallel to the incident surface.

8. The display apparatus of claim 1, wherein the support part and the spacer member are provided as one body, and
    wherein the spacer member protrudes from the support part in the first direction.

9. The display apparatus of claim 1, wherein the maximum thickness of the air gap in the first direction is less than a distance between the opposite surface and the incident surface in the first direction.

10. The display apparatus of claim 1, wherein a side of the support part directly contacts the spacer member and is coplanar with the light emission surface.

11. The display device of claim 1, wherein a first side of the spacer member directly contacts the light guide plate, and wherein a second side of the spacer member directly contacts the support part, is opposite the first side of the spacer member, and is larger than the first side of the spacer member.

* * * * *